United States Patent [19]
Zarow et al.

[11] 3,932,736
[45] Jan. 13, 1976

[54] AUTOMATIC PELLET PRODUCING SYSTEM

[75] Inventors: Albert I. Zarow, Mount Pulaski, Ill.; Joseph A. Volk, Jr., Florissant, Mo.

[73] Assignee: Beta Corporation of St. Louis, Bridgeton, Mo.

[22] Filed: Apr. 8, 1974

[21] Appl. No.: 458,481

[52] U.S. Cl. .................... 235/151.1; 99/487; 137/2; 425/DIG. 230; 235/150.1
[51] Int. Cl.² .................. G05B 13/00; A23N 17/00
[58] Field of Search ............. 235/151, 151.1; 34/46, 34/54; 99/483, 486, 487, 516; 137/2, 487.5; 425/DIG. 230; 426/147, 231, 512

[56] References Cited
UNITED STATES PATENTS

| | | | |
|---|---|---|---|
| 3,148,971 | 9/1964 | MacDonald et al. | 235/151.1 |
| 3,181,482 | 5/1965 | Heth et al. | 99/487 |
| 3,255,975 | 6/1966 | Malin et al. | 235/151.1 |
| 3,260,642 | 7/1966 | Canter | 235/151.1 |
| 3,288,051 | 11/1966 | Dodgen et al. | 426/147 |
| 3,582,349 | 6/1971 | Rasmusson | 426/512 |
| 3,707,978 | 1/1973 | Volk, Jr. | 137/2 |

Primary Examiner—Felix D. Gruber
Attorney, Agent, or Firm—Rogers, Ezell & Eilers

[57] ABSTRACT

A system for automatically producing pellets, and more particularly feed pellets from a milled material. A mixture of milled material of a selected composition is fed to a pellet producing means. The moisture content of the material as it enters the pellet producing means is automatically controlled within prescribed limits as is the feed rate of the material into the producing means, such that there can be no increase in the feed rate unless prescribed moisture conditions are satisfied. Further control means control the feed rate of the material in accordance with prescribed load conditions on the producing means and establish an automatic sequencing of various controlled parameters when an overload condition occurs to prevent damage to the system, relieve the overload condition, and restart the system.

Once the system is activated, operation is completely automatic to establish optimum conditions for maximum productivity, pellet quality, and system life.

55 Claims, 3 Drawing Figures

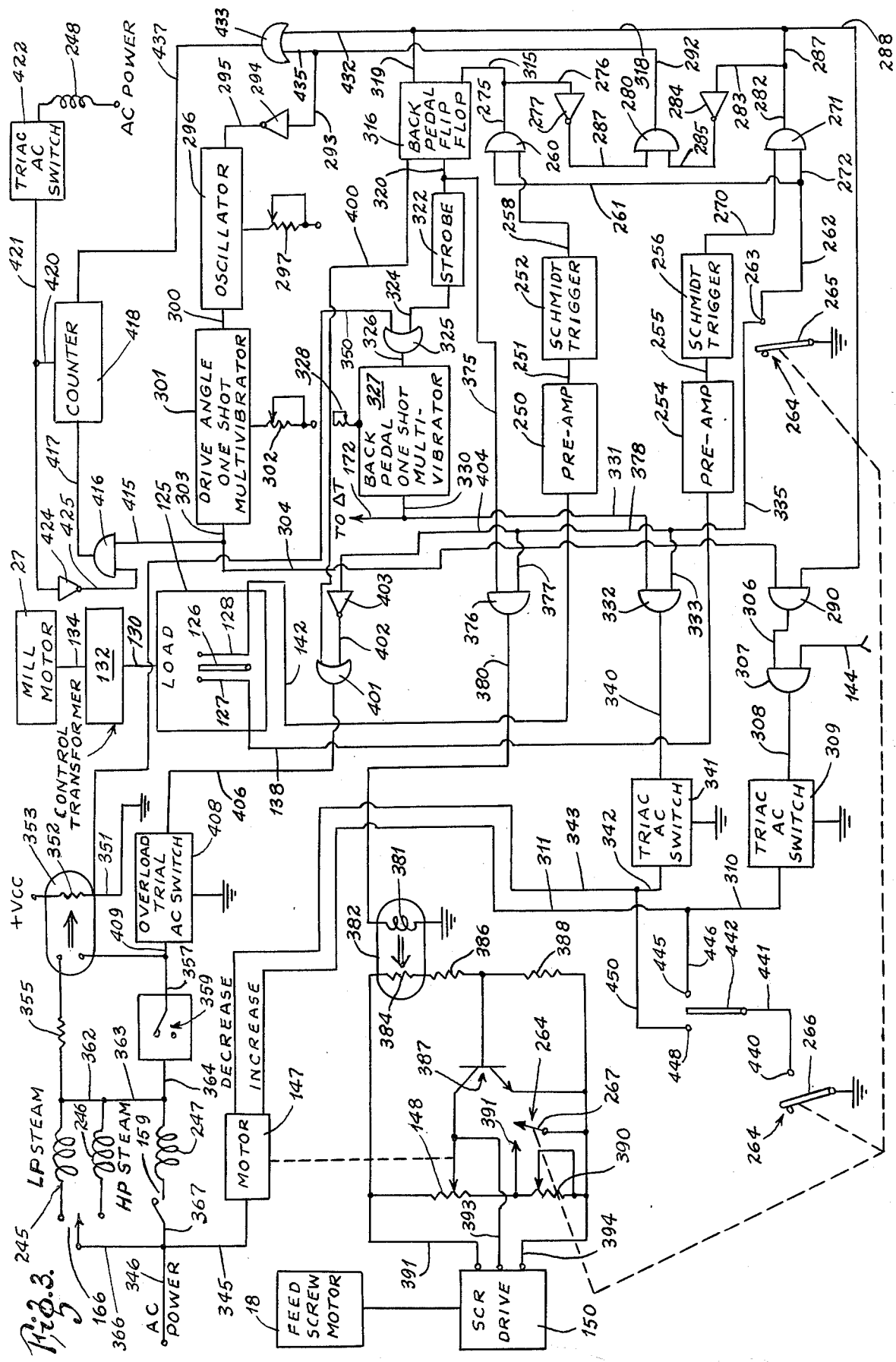

AUTOMATIC PELLET PRODUCING SYSTEM

BACKGROUND OF THE INVENTION

Basically, most feed pellet producing systems include a bin for containing a source of material from which the pellets are to be made, a mixer/conditioner where selected amounts of heat and moisture are added to the material as it is fed from the bin, and a pellet producing means such as a die into which the material is fed from the mixer/conditioner. Suitable means, such as augers, chutes, and the like, are provided to move the material from the bin, through the conditioner, and into the producing means at selected rates. Also included in most such systems are sources of heat and moisture and means for selectively supplying them to the mixer/conditioner for proper mixing with the material.

The pellet producing means is operated by an electric motor which presently, for example, may be from 25 to 300 horsepower. By way of example, a die-type pellet producing means consists of a large hollow cylinder with a large number of radial holes through its wall, and a plurality of rollers mounted within the cylinder in contact with its inside wall. As the cylinder rotates, by means of the electric motor, thereby imparting rotation to the rollers, and as the material is fed into the cylinder, the interaction of the rotating cylinder with the rotating rollers compresses and forces the material through the holes to form solid, worm-like masses which are severed as they are formed to produce pellets.

The load on the producing means, and hence the productivity and efficiency of the system, is dependent on several factors as is the quality of pellets produced.

First, load is, of course, dependent in a direct relationship on the rate at which milled material is fed to the producing means; the faster the feed rate, the greater the load.

Second, load is dependent on the composition of the milled material and its temperature and moisture content as it is fed into the producing means. These factors also have a great effect on pellet quality. It has also been found that for a given animal feed formulation there is a temperature and moisture content of the material at the pellet producing means for optimum pelleting.

These are numerous ingredients commonly used to compose animal feed materials for use in pelleting. The following are given by way of example as being among them:
1. (Water Insoluble)
    Wheat Bran
    Wheat Midds
    Gluten Feed
    Brewer's Grain
    Distiller's Grain
    Hominy Fibers: Soybean Hulls, Cottonseed Hulls, Alfalfa, Malt Hulls, Etc.
2. (Water Soluble)
    Urea
    Milk
    Sugar
    minerals
3.
    Corn
    Milo Maize These are given as examples. Many other ingredients could be included so that the possible animal feed formulations are numerous. But, for each such formulation, there is a temperature and moisture content of the material at the pellet producing means for optimum production and quality. A more complete discussion on the control of temperature and moisture to improve the quality and quantity of pellet production is contained in U.S. Pat. No. 3,573,924.

Hence, it has heretofore been recognized that temperature and moisture content are critical for the high quality and quantity production of pellets including proper loading of the producing means. With prior art systems the parameters such as feed rate and temperature and moisture content of the material have been controlled manually, or at best with the aid of an automatic control on one or more of the parameters independently. The result has been inefficient and often poor quality pellet production caused by the ineptness of the operator, his inability to act quickly enough as the conditions in the system change, or his unwillingness to continually monitor the system. Often overloads occur on the producing means requiring a shutdown of the motor and causing a severe clogging of the producing means that may take hours to remove. Such shutdowns are costly and aggravating, and to avoid them it is common practice to operate the system at a greatly reduced capacity.

While the solutions of these problems have not heretofore been found, the automatic system of this invention overcomes these problems to provide a system that greatly increases the quality and production of pellets, and increases the life of the producing means by providing optimum operating efficiency.

SUMMARY OF THE INVENTION

The automatic pellet producing system of this invention generally comprises a bin for storing a milled material in meal form and of a selected composition, a mixer/conditioner for adding selected amounts of heat and moisture to the material, a pellet producing means, and means for feeding the material from the bin, through the mixer/conditioner, and into the producing means. This system also includes a suitable source of steam and means for supplying the steam to the mixer/conditioner for heating and/or moistening the material.

In a preferred embodiment of the invention, the steam source includes both low and high pressure steam which may be independently selected, and the mixer/conditioner includes means for using the steam to add dry heat to the material such as for preheating, and means for adding live steam directly into the material to increase its moisture and temperature content. In the preferred embodiment, the conditioner includes a steam jacket surrounding the chambers of the mixer/conditioner through which the material moves, into which steam jacket is supplied steam to provide dry heat to the material. Also provided are means to supply live steam directly into the chambers to thereby increase the moisture content of the material as well as the heat content. The mixer/conditioner also includes a mixing means in the chambers to insure thorough mixing of the steam with the material.

The system further comprises an automatic control means for controlling the moisture content of the material as it is fed into the producing means, the feed rate of the material into the producing means, the load on the producing means, and the interrelationships of these parameters during all phases of system operation.

More specifically, the automatic control means comprises means for controlling the moisture content and temperature of the material as it enters the producing means. In a preferred embodiment of the invention this is achieved by sensing the temperature of the material prior to entering the mixer/conditioner, sensing the temperature of the material as it enters the producing means, and maintaining the difference in these temperatures ($\Delta T$) to within a prescribed range by controlling the supply of steam to the mixer/conditioner accordingly. This makes use of the fact that with steam of a selected quality, a given rise in temperature by the direct application of live steam to the material, increases the moisture content of the material by a given amount. For example, with application of steam at 100 p.s.i., it has been found that a 20° rise in the temperature of the milled material produces a 1 percent increase in moisture content of the milled material. Hence, by measuring the temperature and moisture content of the material prior to entering the mixer/conditioner and by knowing the optimum temperature and moisture content for proper pelleting at the producing means for a given material composition, a $\Delta T$ can be calculated to achieve the optimum conditions, provided this $\Delta T$ is attained with the selected applications of live steam directly to the material as well as dry heat or either separately. Additionally, there may be circumstances, such as where the moisture content of the material is initially quite low, where raw water, liquid molasses, or other sources of moisture are added as well. Therefore, the control of $\Delta T$ is a convenient way to control the temperature and moisture content of the material as it enters the producing means. With the combined use of dry heat and the steam of selected quality directly in the chambers of the mixer/conditioner, the proper moisture and temperature can be maintained.

The automatic control means further comprises means for selecting a normal operating load range for the producing means, and means for controlling the feed rate of the material into the producing means as a function of the load. Of primary importance, the control system interrelates these controlled parameters under the various operating conditions. Thus, means are provided for automatically insuring that proper moisture conditions exist with the material before allowing an increase in feed rate irrespective of load.

Of further primary importance, the control system automatically senses an overload condition and makes the necessary corrections to eliminate it. Hence, means are provided for sensing an overload condition, and for shutting off the steam supply and the feed drive which feeds the material to the producing means when an overload condition is sensed. Also in response to the overload condition, the system is automatically adjusted such that when the overload condition is relieved, the system begins operation at a lower feed rate and with a lesser amount of steam supplied to the material than under the previous operating conditions. Means are provided for automatically increasing the feed rate in selected increments to satisfy the selected load range, both at initial start-up of the system and just after an overload has been relieved, but only after first satisfying the moisture content requirements.

Should the overload condition persist for a prescribed duration, the control system includes means for automatically shutting down other functions of the system and for opening the chute to the pellet producing means to further relieve the load.

Hence, it is a primary object of this invention to provide a pellet producing system that operates automatically in its various operating conditions to insure optimum quality and production of pellets. This and other objects of the invention will become apparent from the drawing and detailed description to follow.

DESCRIPTION OF THE DRAWINGS

FIGS. 2 and 3 are electrical schematic diagrams of the automatic control portion of this invention for controlling a pelleting apparatus.

DESCRIPTION OF A PREFERRED EMBODIMENT

Figure 1:
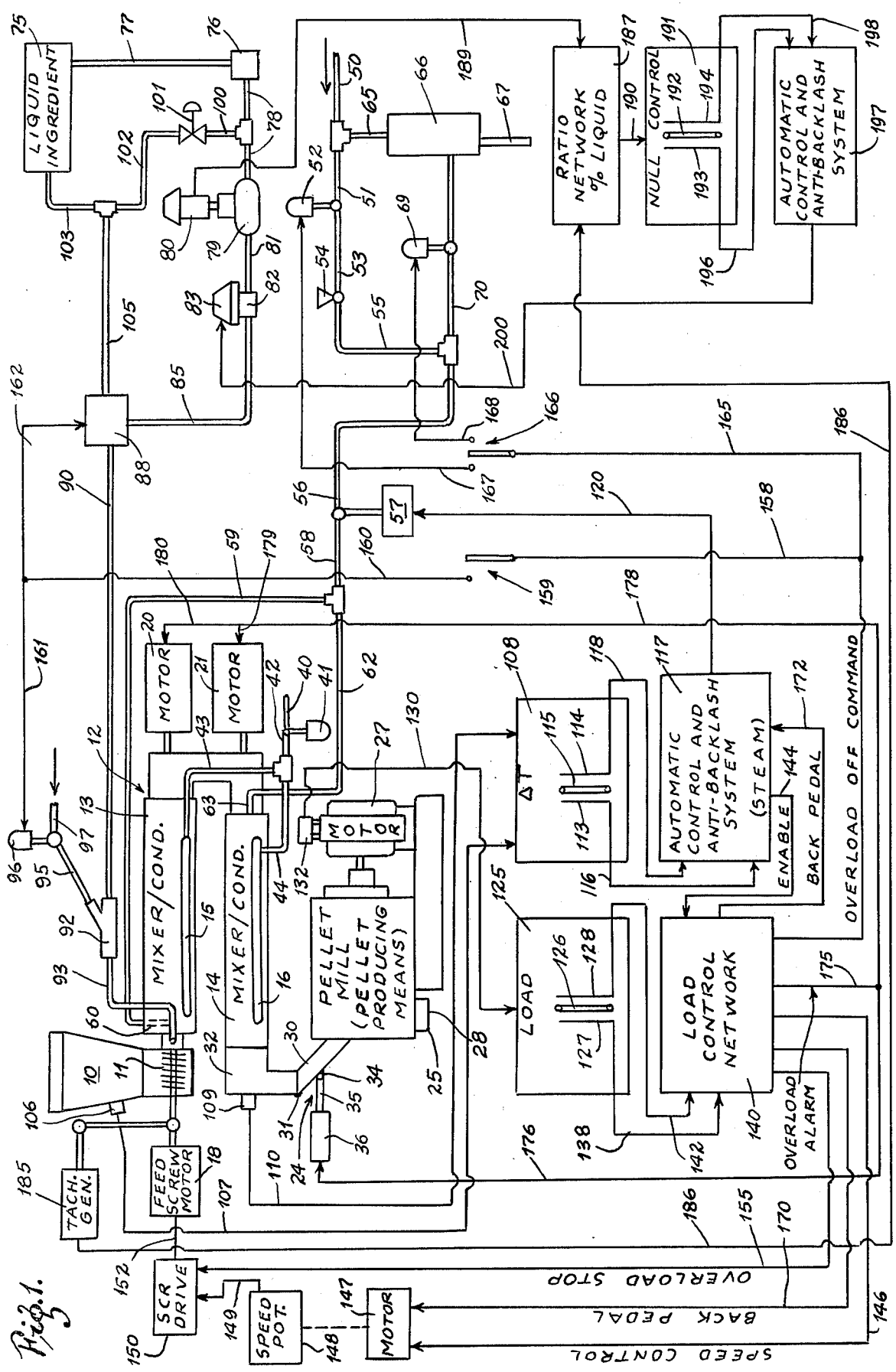
FIG. 1 is a general schematic diagram showing an entire system of this invention.

Referring to FIG. 1 of the drawing there is shown a general schematic diagram of an entire system of this invention. There is shown a bin 10 for holding a supply of material from which pellets are to be made. In the case of feed pellets, the material is preferably in milled form and is composed from any of a great variety of animal feed formulations including the numerous ones most commonly used in the art. The milled material is fed by means of an appropriate feed screw 11, auger, gravimetric feeder, or the like into a mixer/conditioner 12 having a first stage 13 and a second stage 14, each of which have steam jackets 15 and 16, respectively. The feed screw 11 is operated, or made to rotate, by means of a variable speed feed screw motor 18. Each mixer/conditioner section includes rotating paddles or the like to agitate and add turbulence to the material for purposes to be described as the material moves therethrough. A motor 20 operates the agitator for stage 13, and a motor 21 operates the agitator for stage 14 of the mixer/conditioner.

From the mixer/conditioner 12, the material is fed down a chute 24 and into a pellet mill or pellet producing means 25. The pellet mill 25 might for example be of the die type and comprise a rotating cylinder with radial holes therein and rollers mounted within the cylinder as described above under Background of the Invention. The material is fed into the cylinder, and, by interaction of the cylinder and rollers, is forced through the holes in the cylinder and severed to form pellets. The die, or pellet mill, is operated by a relatively high horsepower electric motor 27 which might, for example, be from 25 to 300 horsepower. After severing, the pellets fall through an opening 28 at the bottom of the mill 25. The chute 24 has a lower section 30 hinged at 31 to an upper portion 32 located at the outlet of the mixer/conditioner, which lower portion 30 is pivotally connected at 34 to the piston 35 of an electrically actuated pneumatic cylinder 36 for purposes to be described.

A source of steam is supplied through a steam line 40, a control valve 41, a line 42, and a line 43 to the steam jacket 15 of the mixer/conditioner stage 13, and is also fed from the line 42 through a line 44 to the steam jacket 16 of the mixer/conditioner stage 14. In this described embodiment the supply of steam to the steam jackets 15 and 16 is set manually to supply a constant amount of heat to the chambers of the mixer/conditioner sections and thereby supply a constant amount of dry heat to the material as it travels through the mixer/conditioner.

The system also includes means for supplying live steam directly into the chamber of the mixer/conditioner 12 for adding moisture to the material as it moves therethrough. This comprises a source of low pressure steam, preferably at 15 p.s.i., which is fed through a line 50, a line 51, a control valve 52, a line 53, a pressure regulator 54, a line 55, a line 56, a modulating steam flow control valve and motor 57, a line 58, a line 59, and a steam header and nozzles 60 and into the chamber of the mixer/conditioner section 13. The steam is also fed from the line 58 through a line 62 and a rotary joint 63 to heat the hollow shaft of the mixer/conditioner. The source of steam is also fed from the line 50 through a line 65 and into a separator 66. The purpose of the separator is to separate liquid water from the steam thereby insuring good quality steam for mixing with the material. The water drains from the bottom 67 of the separator 66, and the steam is fed through a line 68, a control valve 69, and a line 70. From there it is fed into the line 56 and ultimately through the nozzles 60 and 63 as with the wet steam.

In this preferred embodiment of the invention, only one type of steam, either low pressure or high pressure steam, is used at a time, and therefore only one of the control valves 52 or 69 is open at a time. Hence, if the valve 52 is open and the valve 69 closed, low pressure steam is supplied to the chambers of the mixer/conditioner, and if the valve 69 is open and the valve 52 closed, high pressure steam is supplied to the chambers. Whether low or high pressure steam is used depends on the composition of the material and the desired moisture content and temperature of the material as it enters the pellet mill 25. In this described embodiment, the low pressure steam at the output of the regulator 54 is at 15 p.s.i., and the high pressure steam at the output of the valve 69 is at 100 p.s.i. Hence, with the proper combination of either low or high pressure steam fed directly into the chambers of the mixer/conditioner to be thoroughly mixed with the milled material, together with the proper amount of steam supplied to the steam jackets 15 and 16 to add dry heat to the material as it travels through the mixer/conditioner, the proper amount of moisture, temperature, and turbulence can be added to the material as it passes from the bin 10 such that its moisture content and temperature upon entering the pellet mill 25 is optimum for maximum pellet quality. Maximum pellet production for a given load generally also exists.

Since the load on the pellet mill 25, and therefore the motor 27, is related to the feed rate of the material from the bin 10 to the pellet mill 25, which in turn is related to the speed of the feed screw and feed screw motor 18, and since the pellet mill load is further related to the temperature and moisture content of the material as it enters the pellet mill, each of these parameters, and the relationships between them, must be controlled for optimum pelleting. This invention provides a system for controlling these parameters and relationships automatically as will be described.

It is common in the production of feed pellets to add a liquid ingredient, such as liquid molasses as a source of water and for palatability, to the material as it moves from the bin 10 into the mixer/conditioner 12. Hence, there is shown a tank 75 for storing a supply of liquid ingredients, such as molasses, which is pumped by means of a pump 76 from an outlet in the tank through a line 77, a line 78, flow meter 79 having combined therewith a tachometer generator 80, through a line 81, a valve 82 having an electrically operated motor and gear train 83 combined therewith for operating the valve 82, and through a line 85, to the input of an electrically operated diverter valve 88. The valve 88 has one output connected by a line 90 to one input of a Y connector 92, the output of which is connected by a line 93 to a suitable nozzle located within, and at the input of, the chamber of the mixer/conditioner section 13. The other input of the Y connector 92 is connected by a line 95, a control valve 96, and a line 97 to a suitable source of steam (not shown).

The liquid ingredient in the line 78 at the output of the pump 76 is also fed through a line 100, a back pressure valve 101, a line 102, and a line 103 to the input of the tank 75. A second output of the diverter valve 88 is connected by a line 105 to the line 103 connected to the input of the tank 75.

Generally, under normal operation, and assuming it is desired to mix a certain amount of liquid ingredient to the material as it enters the mixer/conditioner 12, the liquid is pumped from the tank 75 through the diverter valve 88 and the line 90 into the Y connector 92. At the same time steam is fed through the valve 96 to the Y connector 92 to mix with the liquid causing great turbulence and an elevation of temperature in the liquid as it is fed through the line 93 and into the input of the chamber of the mixer/conditioner section 13. This turbulence produces a more thorough mixing of the liquid with the milled material as it is fed into the mixer/conditioner, which mixing is further completed by the agitation (turbulence) of the material within the chambers of the mixer/conditioner as dry heat and live steam are added to increase the temperature and moisture content of the material. Of course, the amount of liquid ingredient added to the material at the input of the mixer/conditioner affects the amount of live steam that must be added to the material in the mixer/conditioner to attain the optimum moisture content at the pellet mill 25.

The automatic control system, and the parameters it controls, will first be generally described with reference to FIG. 1. The system of this described embodiment makes use of the fact that for a given material composition there is an optimum temperature and moisture content for the material as it enters the pellet mill 25. By knowing this temperature and moisture content, by knowing the temperature and moisture content of the material in the bin, and by knowing the amount of moisture added to the material with liquid ingredient (if used) as it enters the mixer/conditioner, and further by properly selecting the amount of dry heat added to the material as it passes through the mixer/conditioner, and by applying steam of known quality directly into the mixer/conditioner chambers to mix with the material, then a differential in temperature between the temperature of the material at the bin and the temperature of the material at the pellet mill can be selected that will give optimum pelleting. Hence, the proper moisture content of the material can be maintained at the pellet mill by maintaining a proper differential in temperature between the material at the bin and the material at the pellet mill.

A temperature sensor 106 senses the temperature of the material at the bin 10 and feeds a signal representing that temperature through a conductor cable 107 to one input of the indicating needle of a dual set point meter 108, and another temperature sensor 109 senses the temperature of the material as it enters the pellet mill 25 and sends a signal representing that temperature through a conductor cable 110 to a second input of the indicating needle of meter 108. The meter 108 has a lower limit set pointer 113, an upper limit set pointer 114, and an indicating needle 115. It is of a standard type, commonly known in the art, which indicates by appropriate signals at its outputs whether the indicating needle 115 is below, between, or above the pointers 113 and 114. The meter 108 also includes appropriate means for calibration, and by its needle 115, reads the temperature differential ($\Delta T$) between the temperature sensed by the sensor 109 and the temperature sensed by the sensor 106. The lower limit output 113 from the meter 108 is connected by a conductor 116 to an input of an automatic control and antibacklash system 117, another input of which is connected by a conductor 118 to the upper limit output 114 of the meter 108. The network 117 has an output connected by a conductor cable 120 to the modulating steam valve and motor 57.

The network 117 is fully described in U.S. Pat. No. 3,707,978, incorporated herein by reference, and is such that a signal at its input 116, indicating that the needle 115 has dropped below the pointer 113, produces pulse-type signals at the output conductor cable 120 to incrementally move the valve 57, toward its open position; and, upon receiving a signal on its input conductor 118 indicating that the needle 115 has moved above the pointer 114, produces signals on the output conductor 120 to incrementally move the valve 57 toward its closed position. When the needle 115 is between the pointers 113 and 114, no signal is generated on the conductor cable 120 and the valve 57 remains unchanged. The network 117 also generates an antibacklash signal on the conductor cable 120 whenever the needle 115 moves across both pointers 113 and 114 to quickly remove any mechanical backlash in the valve and motor assembly 57 which is usually present when the valve and motor change directions in order to maintain proper control. The only time a change in direction occurs is where the needle 115 moves from below the pointer 113 to above the pointer 114 or from above the pointer 114 to below the pointer 113, as otherwise the motor and valve 57 continue to operate in the same direction to make the necessary corrections. All of this is fully described in U.S. Pat. No. 3,707,978.

The control system also includes another meter 125 having a needle 126 and lower and upper set points 127 and 128, respectively. The input of the meter 125 is connected by a conductor cable 130 to transducer (control transformer) 132. Transducer 132 is magnetically coupled to the motor 27, so that the conductor cable 130 carries a signal representing the load on the motor 27. The meter 125 is very similar to the meter 112, but is calibrated such that the needle 126 reads in percent pellet mill load as represented by the signal on the conductor 130. The pointer 127 is set to an operating load for the system, and the pointer 128 is set to an overload position. The meter 125 has a lower set point output connected by a conductor 183 to one input of a load control network 140 to be hereinafter described in more detail, and an upper set point output connected by a conductor 142 to another input of the network 140.

When the needle 115 of the meter 112 is between the set points 113 and 114, the network 117 generates an enable signal at an output which is fed through a conductor 144 to another input of the network 140. If a signal appears on the conductor 138 indicating that the needle 126 is at or below the set pointer 127 of the meter 125, and if an enable signal is generated by the network 117, the network 140 generates a speed control signal which is fed through a conductor 146 to a motor 147. The motor 147 mechanically drives a speed pot 148 which generates a signal through a conductor cable 149 to inputs of an SCR drive 150. The output of the SCR drive 150 is connected by conductor cable 152 to the feed screw motor 18. The speed control signal on the conductor 146 is such as to cause the motor 147 to drive the speed pot 148 in a direction to increase the speed of the feed screw motor 18, thereby increasing the speed of the feed screw which is feeding material from the bin to the pellet mill. This increases the load on the pellet mill motor 27 thereby causing the needle 126 to move upscale. The speed of the feed screw motor 18 will continue to increase until the needle 126 moves above the lower set pointer 127 or until the enable signal on the conductor 144 is removed as will be more fully described.

Should the load on the motor 27 increase to where the needle 126 moves above the upper set pointer 128, a signal appears on the conductor 142 to the network 140. When this occurs, the network 140 generates an overload stop signal at an output which is fed through a conductor cable 155 to another input of the SCR drive 150 causing the feed screw motor 18 to stop. The network 140 also generates an overload off signal at an output which is fed through a conductor 157, a conductor 158, a switch 159, a conductor 160, and a conductor 161 to the control valve 96 immediately shutting off the valve 96, thereby shutting off the supply of steam to the liquid ingredient. The signal on the conductor 160 is also fed through a conductor 162 to the diverter valve 88 immediately causing the valve 88 to divert the flow of liquid ingredient to the output liquid line 105 and back into the tank 75, thus cutting off the supply of liquid ingredient to the material at the mixer/conditioner 12. The signal on the conductor 157 is also fed through a conductor 165 to the wiper arm of a single-pole, double-throw, center-off steam select switch 166. One pole of the switch 166 is connected by a conductor 167 to the low pressure steam control valve 52, and the other pole of the switch 166 is connected by a conductor 168 to the high pressure steam control valve 69. Depending on the position of the switch 166, which in turn depends on which type of steam (low or high pressure) is being used, the valve 52 or 69 as appropriate, is immediately closed to cut off the supply of live steam to the chambers of the mixer/conditioner 12.

Also when this overload condition occurs (where the needle 126 is at or above the pointer 128 of the meter 125), a back pedal signal is generated at an output of the network 140 which is fed through a conductor 170 to another input of the motor 147 causing the motor 147 to decrease the speed pot 148 an amount dependent on the duration of the back pedal signal for reasons which will be more fully explained. The network 140 also generates a signal which is fed through a conductor 172 to an input of the network 117 and which, as will be more fully described, causes the modulating valve 57 to close an amount dependent on the duration of the back pedal signal.

If the overload condition persists for a prescribed duration, a signal is generated at an output of the load control network 140 which is fed through a conductor 175 and the conductor 176 to actuate the cylinder 36 and open the chute section 30 to dump the material. The alarm signal on the conductor 175 is also fed through a conductor 178 and a conductor 179 to the motor 21 to stop the mixing paddles in the mixer/conditioner section 14, and through a conductor 180 to the motor 20 to stop the mixing paddles in the mixer/conditioner section 13.

Also included is a control for automatically maintaining a constant percentage of liquid ingredient from the tank 75 in the material irrespective of the feed rate of the material. It can be seen that as the feed rate of the material increases, the addition rate of liquid ingredient must be increased appropriately to maintain a constant liquid percentage. Conversely, a decrease in feed rate requires a decrease in the rate at which liquid ingredient is added.

Thus, a tach generator 185 is mechanically connected to the shaft of the feed screw motor 18 to generate signals at its output representative of the feed rate of the material. These signals are fed through a conductor 186 to one input of a ratio network 187. The network 187 has another input connected by a conductor 189 to the output of the tach generator 80 which produces signals on the conductor 180 representative of the rate of flow of liquid ingredient to the material. The network 187 has an output connected by conductors 190 to the input of a null meter 191. The null meter 191 has a needle 192 and lower and upper set pointers 193 and 194, respectively, and operates such that the needle 192 moves to a position such that the meter circuit seeks a null condition in accordance with the signals appearing on the conductors 190. The signals on the conductors 190 in turn depend on the relative signals at the inputs 186 and 189 of the ratio network 187. The null meter 191 has a lower limit output connected by a conductor 196 to one input of an automatic control and antibacklash network 197, and has an upper limit output connected by a conductor 198 to another input to the network 197. The network 197 has an output connected by a conductor cable 200 to the motor and gear train assembly 83 of the control valve 82 in the liquid ingredient line.

The network 197, like the network 117, is fully disclosed in U.S. Pat. No. 3,707,978, incorporated herein by reference, and which has previously been described generally with respect to the network 117. Thus the network 197 is such that when the needle 192 drops to or below the pointer 193 a signal is fed through the conductor 196 to one input of the network 197 causing pulse signals to be generated at its output and fed through the conductor 200 so as to incrementally open the valve 82. When the needle 192 moves to or above the set pointer 194, a signal is fed through the conductor 198 to the other input of the network 197 causing pulse signals to be generated at its output which are fed through the conductor 200 to incrementally close the valve 82 in the manner set forth in U.S. Pat. No. 3,707,978. The network 197 also includes the antibacklash capability described in that patent and previously referred to with respect to the network 117.

In operation of the liquid proportioning control, the set pointers 193 and 194 are set to maintain the null and thus liquid percentage within prescribed limits. As long as the needle 192 is between the pointers 193 and 194, there is no signal generated from the network 197 and the valve 82 remains unchanged to supply a constant amount of liquid to the material. However, if any change occurs in either the flow rate of the liquid as measured by the tach generator 80 or the feed rate of the material as measured by the tach generator 185, these conditions will be reflected by the relative signals on the input conductors 186 and 189 to the ratio network 187, which in turn will be reflected by the signals on the conductors 190 causing the needle 192 to move up or down. Obviously, if either the feed rate of the material increases or the flow rate of the liquid decreases, the needle 192 will drop, and if the feed rate of the material decreases or the flow rate of the liquid increases, the needle 192 will rise. If the needle 192 drops below the pointer 193, the network 197 produces a signal to incrementally open the valve 82 until the needle 192 again moves upward to a position between the set pointers. If the needle 192 moves above the pointer 194, the network 197 generates a signal to incrementally close the valve 82 until the needle is back between the set pointers. In this manner a constant percent of liquid ingredient 75 can be maintained in the material.

The ΔT and load control systems will now be described in more detail with reference to FIGS. 2 and 3.

Figure 2:
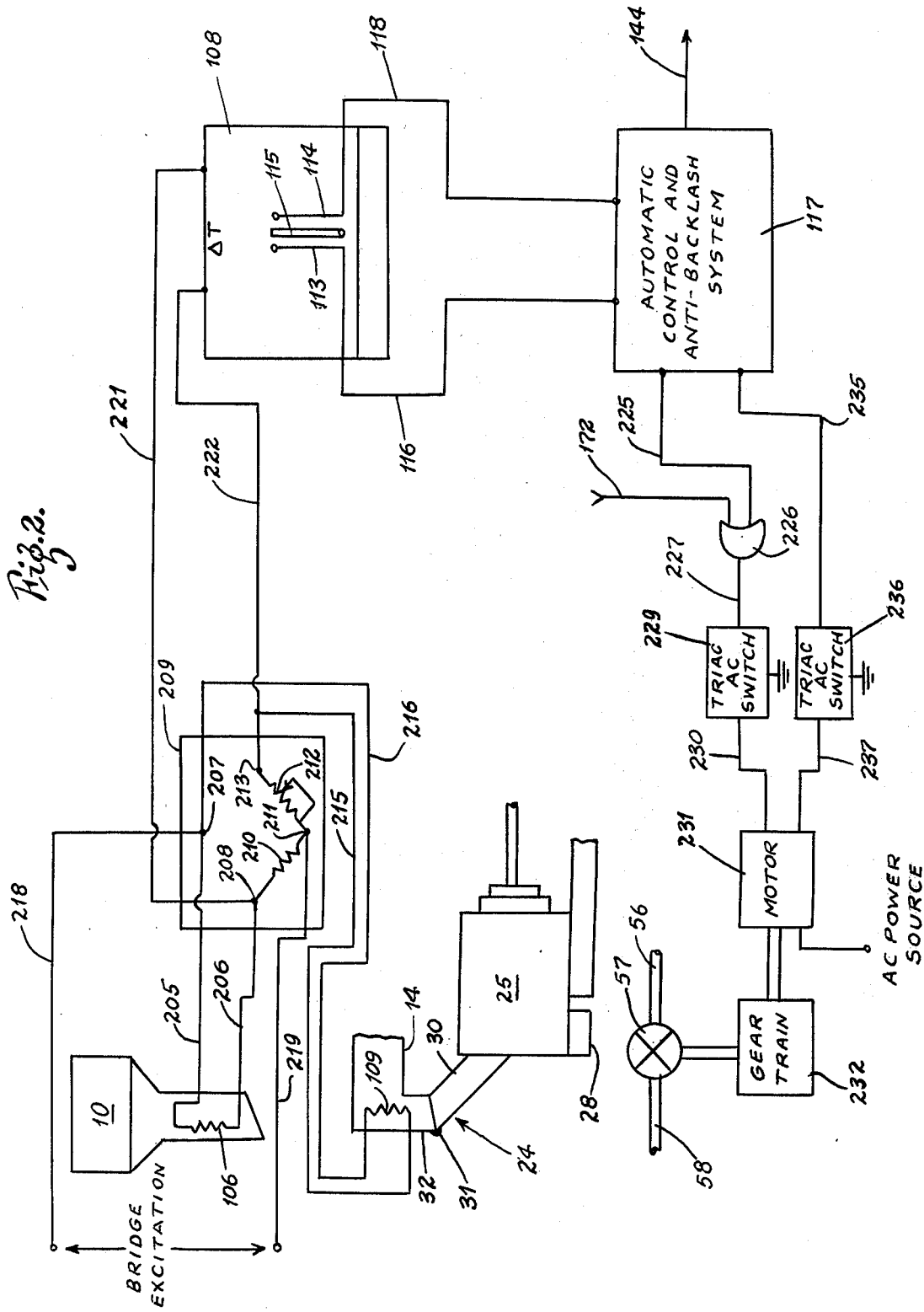

Referring to FIG. 2, the temperature sensor 106 located at the bin 10, is connected by means of conductors 205 and 206 to the terminals 207 and 208 of a bridge network 209. A resistor 210 is connected between the terminal 208 and a terminal 211, and a variable resistor 212 is connected between the terminal 211 and a terminal 213. The temperature sensor 109, located at the chute 24 into the pellet mill 25, is connected by conductors 215 and 216 to the terminals 213 and 207, respectively. An appropriate bridge excitation voltage is applied through conductors 218 and 219 across the terminals 107 and 211, respectively. The output of the network 209 is taken off the terminals 208 and 213 and fed through conductors 221 and 222, respectively, to the inputs of the meter 108.

As previously explained with respect to FIG. 1, the outputs of the meter 108 are fed through conductors 116 and 118 to inputs of the automatic control and antibacklash netowrk 117 which is of a type previously described. The meter 108, as indicated by its needle 115 indicates a difference in temperature (ΔT) represented by the signals on the conductors 221 and 222 which in turn depend on the temperatures sensed by the sensors 106 and 109. Should ΔT drop indicating an inadequate moisture content of the material at the pellet mill 25, such that the needle 115 drops to or below the pointer 113, a signal is generated through the conductor 116 to the network 117 causing a series of short pulse signals to be generated at an output condutor 225. These signals are fed through an OR gate 226 and a condutor 227 to the input of a triac A.C. switch 228 causing the switch to close with each pulse. The switch 229 has an output connected by a conductor 230 to one winding of a motor 231, which is mechanically connected through a gear train 232 to the valve 57, such that turning of the motor in one direction opens the valve and turning of the motor in the opposite direction closes the valve. Each time a pulse occurs at the input of the triac switch 229, the conductor 230 is grounded applying A.C. power through a winding of the motor which causes the motor to turn in a direction to close the valve 57.

The OR gate 226 has another input connected by the conductor 172 to the load control network 140 in a manner to be described.

If the needle 115 should move to or above the set pointer 114, a signal is fed through the conductor 118 to another input of the network 117 which produces a series of short pulses at an output conductor 235 which are fed to the input of another triac switch 236 which is identical to the switch 229. The output of the switch 236 is connected by a conductor 237 to another winding of the motor 231 which when energized with A.C. power causes the motor 231 to turn in a direction to open the valve 57. Thus, a signal at the output conductor 225 closes the valve 57 and a signal at the output conductor 235 opens the valve 57.

When, and only when, the needle 115 is between the pointers 113 and 114, the enable signal is generated at the output of the network 117 which is fed through the conductor 144 to the load control network 140 to be more fully described.

To assist in relating the network described in U.S. Pat. No. 3,707,978 to the network 117 shown in FIG. 2, the conductor 116 here corresponds to the conductor 55 of the patent, the conductor 225 here corresponds to the conductor 130 of the patent, the conductor 235 here corresponds to the conductor 135 of the patent, and the signal on the conductor 144 here is the same signal that appears on the conductor 106 of the patent.

Hence, under normal operating conditions, the network of FIG. 2 automatically operates the modulating steam valve 57 to supply the proper quantity of live steam to the mixer/conditioner 12 for mixing with the material so as to maintain the temperature differential ($\Delta T$) within the prescribed limits set by the set pointers 113 and 114.

The load control network 140 will now be described in more detail with reference to FIG. 3. At the outset it should be noted that there is shown in FIG. 3 a relay coil 245 which, when excited, opens the low pressure steam valve 52, a relay coil 246 which, when excited, opens the high pressure steam valve 69, and a relay coil 247 which, when excited, operates the diverter valve 88 to deliver the liquid ingredient to the material and opens the steam valve 96. There is also a relay coil 248 which, when excited, operates the piston 36 to open the chute portion 30 and dump the material and also turns off the mixer/conditioner motors 20 and 21.

As heretofore described with reference to FIG. 1, the load meter 125 receives a signal at its input conductor cable 130 respresenting the load on the pellet mill motor 27, which load is indicated by the reading of the needle 126. When the indicating needle 126 of the meter 125 moves upscale to a position adjacent the upper limit pointer 128 or above, a signal is fed through the output conductor 142, a preamp network 250, where the signal is amplified, and a conductor 251, to the input of a Schmidt trigger 252. When the indicating needle 126 moves downscale to a position adjacent the lower limit pointer 127 or lower, a signal is fed through the conductor 138, a preamp network 254 of the same type as the preamp network 250, and a conductor 255 to the input of another Schmidt trigger 256. Although the signal on either the output conductor 142 or 138 from the meter 125 appears very quickly, it nevertheless has a finite slope. The Schmidt triggers 252 and 256 sense when the output s ignals from the preamps 250 and 254, respectively, reach a certain level and immediately produce at their output a 1 level signal. The outputs of the Schmidt triggers 252 and 256 go from a 0 level to a 1 level in a matter of only a few nanoseconds, so as to effectively sharpen the signal at the outputs of the preamps 250 and 254 for use in the network logic.

The output of the Schmidt trigger 252 is connected through a conductor 258 to one input of an AND gate 260. The AND gate 260 has another input connected by a conductor 261 and a conductor 262 to the normally open terminal 263 of a triple-pole, double-throw switch 164 having wiper arms 265 and 266 connected to ground, and another wiper arm 267 connected in a manner to be described. The output from the Schmidt trigger 256 is connected through a conductor 270 to one input of an AND gate 271 having another input connected by a conductor 272 and the conductor 262 to the normally open terminal 263 of the switch 264. The output from the AND gate 260 is connected through a conductor 275, a conductor 276, an inverter 277 and a conductor 278 to one input of an AND gate 280. The output from the AND gate 271 is connected through a conductor 282, a conductor 283, an inverter 284, and a conductor 285 to the other input of the AND gate 280.

The output from the AND gate 271 is also connected through the conductor 282, a conductor 287, and a conductor 288 to one input of an AND gate 290.

The output from the AND gate 280 is connected through a conductor 292, a conductor 293, an inverter 294, and a conductor 295 to the input of an oscillator 296. As long as the input of the oscillator 296 is at a 1 level, the oscillator generates a series of sharp pulses, the frequency of which is adjustable with a potentiometer control 297. The exact frequency used depends on how quickly it is desired that the feed rate increase when below the lower set limit, and this in turn will depend on the responsiveness of the system in controlling the prescribed pellet mill load. A frequency range of between five pulses per second and one pulse every 4 seconds is an example of a normal range. When the signal at the input to the oscillator is at a 0 level, the oscillator 296 is inhibited. As will be seen, this occurs whenever the indicating needle 126 is within the accepted range between the pointers 127 and 128. Whenever the needle 126 moves below the pointer 127 or above the pointer 128, the oscillator 296 is enabled.

The output pulses from the oscillator 296 are fed through a conductor 300 to a drive-angle, one-shot multivibrator 301 which produces a pulse, the width of which is adjustable by a potentiometer control 302, for each pulse received at its input from the oscillator 296. The pulses from the monostable multivibrator 301 are fed through a conductor 303 and a conductor 304 to the other input of the AND gate 290.

Whenever the load becomes low, that is, whenever the indicator 126 falls below the pointer 127, the AND gate 290 is enabled. When the AND gate 290 is enabled, pulse signals are fed from its output through a conductor 306 to one input of an AND gate 307, the other input of which receives the enable signal on the conductor 144 from the automatic control and anti-backlash network 117 of FIG. 2. When the AND gate 307 is enabled, which is when the AND gate 290 is enabled and an enable signal appears on the conductor 144, pulse signals are fed from the output of AND gate 307, through a conductor 308, to the gate input of a triac A.C. switch 309. The switch 309 has an output connected by a conductor 310 and a conductor 311 to a winding of the motor 147 which, when energized with A.C. power, causes the motor to turn in a direction to turn down the speed pot 148 and decrease the speed of the feed screw motor 18 and thus the feed rate of the material.

Another important features of this invention is the back pedal network. When an overload condition occurs, as when the needle 126 moves adjacent to or above the limit pointer 128, the control network of this invention not only immediately shuts down certain functions of the system as will be described, but also back pedals certain functions so that when they are restarted, such as after the overload condition is relieved, they start at a lower rate so as not to immediately cause another overload condition. This is accomplished by means of the back pedal network of this invention.

The output of the AND gate 260 is also connected through the conductor 275 and a conductor 315 to one input of a back pedal flip-flop 316. The output of the AND gate 271 is fed through the conductors 282 and 287, a conductor 318 and a conductor 319 to the other input of the flip-flop 316. The only time the outputs of the flip-flop 316 change state is when the signals at its input change state, and this is only when the needle 126 moves completely across both of the pointers 127 and 128. The flip-flop 316 has an output connected by a conductor 320 and a conductor 321 to the input of a strobe 322. When the input of the strobe 322 goes from a 0 to a 1 level, the strobe produces at its output a strobe pulse, which is fed through a conductor 324 to one input of an OR gate 325. The flip-flop 316 is such that when its input conductor 315 goes from a 0 level to a 1 level, its output conductor 320 goes from a 0 level to a 1 level to produce the strobe pulse, and this only occurs when the needle 126 moves from below the pointer 127 to above the pointer 128. This strobe pulse is fed through the OR gate 325 and a conductor 326 to the input of a back pedal one-shot multivibrator 327 which produces at its output, for each such strobe pulse, a pulse having a width adjustable by a control potentiometer 328. The pulse from the output of the monostable multivibrator 327 is fed through a conductor 330 and a conductor 331 to one input of an AND gate 332. The other input of the AND gate 332 is connected by a conductor 333 and a conductor 335 to the normally open terminal 263 of the switch 264.

When the AND gate 332 is enabled, which is when it receives the back pedal signal from the monostable multivibrator 327, and when the switch 264 is in the position shown (automatic), a pulse signal is fed from the output of the AND gate 332 through a conductor 340 to the input of a triac A.C. switch 341. The output of the switch 341 is connected by a conductor 342 and a conductor 343 to another winding of the motor 147 which, when energized with A.C. power, causes the motor 147 to turn in a direction to turn down the speed pot 148 and in turn reduce the speed of the feed screw motor 18 and the feed rate of the material. The windings of the motor are connected by conductors 345 and 346 to a suitable source of A.C. power. Thus, when a signal appears at the input of the switch 341, its output is grounded, and a winding of the motor 147 is energized to decrease the feed rate of the material, and when a signal appears at the input of the switch 309, its output is grounded to energize a winding of the motor 147 to increase the feed rate of the material.

It should be remembered that the signals on the conductor 308 at the input of the switch 309 are a series of short pulses from the drive-angle one-shot multivibrator 301 to cause the feed screw motor 18 to increase incrementally with each short pulse, whereas the signal on the input conductor 340 of the switch 341 is from the back pedal one-shot multivibrator 327 which is a single pulse of a width substantially greater than the pulses at the input of the switch 309 and which only occurs when the needle 126 moves from below the pointer 127 to above the pointer 128.

The signal at the output of the back pedal one-shot multivibrator 327 is also fed through the conductor 330 and the conductor 172 to the OR gate 226 of FIG. 2. This signal is fed through the OR gate 226, and the conductor 227 to ground the traic A.C. switch 229 and cause the modulating steam valve motor 231 to turn in a direction to partially close the valve 57.

There are other conditions where it is desirable to generate the back pedal pulse and this is where certain other malfunctions occur in the system. Thus, the OR gate 325 has another input connected by a conductor 350 to a voltage divider network consisting of a resistor 351 having one side connected to ground and the other side connected to the photocell 352 of a photo coupler 353. The conductor 350 is connected between the resistor 351 and photocell 352. The other side of the cell 352 is connected to a suitable D.C. supply. The photo coupler 353 has a neon-type lamp 354 with one side connected to a current limiting resistor 355 and the other side connected by a conductor 356 and a conductor 257 to the wiper arm of a switch 359, representative of one or more interlock functions to be detected. For example, there could be one such switch to detect whether there is material in the bin 10, another to detect whether the mixer is running in the mixer/conditioner section 13, another to detect whether the mixer/conditioner section 14 is running, another to detect whether the pellet mill 25 is running, another to detect whether the feeder 11 is energized, and another to detect whether the cooler, a device for cooling the pellets after leaving the pellet mill, is overloaded with pellets and incapable of carrying them away at a sufficient rate. While only one such interlock switch 359 is shown, there could be as many of these connected in series as there are functions to be detected. If the function is operating normally, the switch is closed.

The other side of the resistor 355 is connected by suitable conductors to the pole of the switch 359, as is one side of each of the relay coils 245, 246, and 247. The other side of the coils 245 and 246 are connected to opposite poles of the steam select switch 166, the wiper arm of which is connected by a conductor 366 and the conductor 346 to the A.C. power source. The other side of the coil 247 is connected to the pole of the liquid ingredient select switch 159, the wiper arm of which is connected by a conductor 367 and the conductor 346 to the A.C. power.

Assuming that either or both of the switches 166 or 159 is closed, if each of the series of interlock switches 359 is closed, then there is insufficient voltage to light the lamp 354 of the photo coupler 353, and the resistance of the photocell 352 remains high holding the signal on the conductor 350 to the OR gate 325 to 0 level. But, if any one of the switches 359 representing an interlock function opens, indicating that the function is operating improperly, A.C. voltage is applied across the neon lamp 354 to light the lamp and greatly reduce the resistance of the photocell 352. This drives the signal on the conductor 350 to a 1 level to produce a back pedal signal at the output of the monostable multivibrator 327. This signal partially turns back the speed port 148 controlling the feed screw motor 18 and partially closes the modulating steam valve 57 in the manner heretofore described. Thus, a back pedal pulse is generated whenever the needle 126 moves from below the pointer 127 to above the pointer 128 to a condition of overload, or when one of the above-mentioned interlock functions signals a malfunction so as to open one of the interlock switches 359.

As another important feature of this invention, when an overload occurs certain functions are immediately shut down. In this described embodiment, an overload condition immediately turns off the feed screw motor 18 to shut off the feed of the material, shuts off the supply of live steam to the mixer/conditioners, and shuts off the supply of liquid ingredient to the material and the supply of steam that mixes with the liquid ingredient, all for the purpose of relieving the load on the pellet mill motor.

When an overload signal occurs, the 0 level signal at the output conductor 320 of the back pedal flip-flop 316 is also fed through a conductor 375 to one input of an AND gate 376, the other input of which is connected by a conductor 377, a conductor 378, and the conductor 335 to the normally open pole 263 of the switch 264. When the AND gate 376 is enabled, which is when the switch 264 is in the position shown and a signal appears on the conductor 375, a signal is fed from the output of the AND gate 376 through a conductor 380 to the filament 381 of a photo coupler 382. The photo coupler 382 has a photocell 384 having one side connected to one side of the speed pot 148 and the other side connected through a resistor 386 to the base of a transistor 387. A resistor 388 is connected between the base and emitter of the transistor. The collector of the transistor is connected to the arm of the speed pot 148, and the bottom end of the speed pot 148 is connected to one side of a variable resistor 390, the other side of which is connected to the emitter of the transistor 387. The wiper arm 267 of the switch 264 is connected to the emitter of the transistor with a pole 391 of the switch connected between the speed pot 148 and the variable resistor 390. The excitation input of the SCR drive 150 is connected by a conductor 391 to the junction between the top end of the speed pot 148 and the photocell 384. The speed control inputs of the SCR drive 150 are connected by a conductor 393 to the arm of the speed pot 148 and a conductor 394 to the emitter of the transistor 387. The speed at which the feed screw motor 18 operates is directly related to the voltage across the speed control inputs 393 and 394.

When a signal appears on the conductor 380 at the output of the AND gate 376, the filament 381 of the photo coupler 382 is excited thereby greatly reducing the resistance in the photocell 384 and biasing the transistor 387 to conduct, thereby shorting the speed control inputs to the SCR drive and shutting off the feed screw motor. Where there is no signal at the filament 381 of the photo coupler 382, the transistor 387 is turned off, and the speed of the feed screw motor 18 is directly related to the resistance across the inputs 393 and 394 of the SCR drive 150, which is the combined resistance of the speed pot 148 and the variable resistor 390. The purpose of the resistor 390 is to select a minimum feed rate for the motor 18 when the system is initially started and the speed pot 148 may be turned all the way down.

Also, when the needle 126 moves from below the pointer 127 to an overload position, the other output of the back pedal flip-flop drops to a 0 level. This output is connected by a conductor 400 to one input of an OR gate 401, the other input of which is connected by a conductor 402 to the output of an inverter 403. The input of the inverter 403 is connected by a conductor 404 and the conductors 378 and 335 to the normally open pole 263 of the switch 264. When the switch 264 is in the position shown, the signal on the conductor 404 is at a 1 level producing a 0 signal at the output of the inverter 403. Since both inputs of the OR gate 401 are at a 0 level, its output is also at a 0 level and is connected by a conductor 406 to the input of an overload triac A.C. switch 408. The output of the switch 408 is connected by a conductor 409 and the interlock switches 359 to one side of the relay coils 245, 246, and 247. The 0 level signal at the input of the switch 408, opens the normally closed switch 408, deenergizing the relay coils 345, 246, and 247. This shuts off the appropriate one of the live steam valves 52 or 69, actuate the diverter valve 88 to divert the liquid ingredient away from the mixer/conditioner 12, and shuts off the steam control valve 96 through which steam is supplied to the liquid ingredient.

It is another feature of this invention that certain other functions of the system be shut down if the overload persists for a presecribed duration. Thus, in this preferred embodiment of the invention, the lower chute portion 30 is opened to dump the material, and the motors 20 and 21 are shut off to stop the mixers in the mixer/conditioner 12.

The output pulses from the monostable multivibrator 301 are fed through the conductor 303 and a conductor 415 to one input of an AND gate 416, the output of which is connected through a conductor 417 to the input of a counter 418. The counter 418 counts the pulses from the multivibrator 301 until it reaches some predetermined count, which may be set as desired. For example, if it is desired that these other functions be deactivated when no more than eight pulses from the multivibrator 418 occur, then the counter 418 is set to count up to eight. When the counter reaches the selected count, its output goes from a 0 level to a 1 level. This signal is fed through a conductor 420 and a conductor 421 to the gate of a triac A.C. switch 422, as well as through a conductor 423, an inverter 424, and a conductor 425 to the other input of the AND gate 416. This latches counter 418 at the preset count. The switch 422 has an output connected by a conductor 430 to one side of the relay 248, the other side of which is connected to a suitable source of A.C. power. When the counter 418 reaches the set count, the 1 level signal at is output closes the switch 422, energizing the relay 248, thereby opening the chute 30 and shutting off the motors 20 and 21.

The output of the AND gate 271 is connected through the conductors 282, 287, 318, and a conductor 432 to one input of an OR gate 433. Another input of the OR gate 433 is connected by a conductor 435 and the conductor 292 to the output of the AND gate 280. The output of the OR gate 433 is connected by a conductor 437 to a clear input of the counter 418. When the output of the AND gate 271 is at a 1 level, which occurs when the indicating needle 126 drops below the pointer 127, the counter 418 is cleared, causing the switch 422 to open. Also, the counter 418 is cleared and the switch 422 opened when the output of the AND gate 280 is at a 1 level, which occurs when the indicating needle 126 is between the pointers 127 and 128. Hence, the only time the counter circuit is activated is in an overload condition.

Another normally open terminal 440 0f the switch 264 is connected by a conductor 441 to the wiper arm 442 of a manual switch 443. One normally open contact 445 of the switch 443 is connected by a conductor 446 to the conductor 311 leading to one winding of the motor 147. Another normally open contact 448 is connected by a conductor 450 to the conductor 343 leading to the other winding of the motor 147. By placing the switch 264 in its normally open position (the switch is shown in the drawing in its normally closed position), the automatic circuit is disabled, and by manually operating the switch 443 to engage the contact 445 or 448, one side of a winding of the motor 147 is grounded to cause the feed rate of the material to increase or decrease as desired. This would be useful, for example, if there is a breakdown in the automatic network.

Operation

The operation of the system will now be explained from the initial start-up of the system to normal operation and finally in an overload condition. Certain functions are established before automatic operation begins. The motor 27 to the pellet mill 25 is turned on. The motors 20 and 21 that operate the mixer paddles in the mixer/conditioner are turned on, and the feeder SCR drive is enabled. The switch 264 is placed in its automatic position as shown in FIG. 3, and the flow control valve 41 is adjusted to supply a selected amount of steam to the steam jackets 15 and 16 of the mixer/conditioner 12. The switch 166 is positioned to select either low or high pressure steam, and the switch 159 is positioned depending on whether liquid ingredient is to be mixed with the material at the input of the mixer/conditioner 12. If liquid ingredient is to be added, the switch 159 is closed. It will be assumed that all of the interlock functions are satisfied and that the interlock switches 359 are closed. Additionally, the pointer 127 of the meter 125 is set for a selected operating load and the pointer 128 is set to establish an overload condition. The pointers 113 and 114 are set to establish a $\Delta T$ operating range for optimum pellet production and quality.

With these preconditions, milled material is fed from the bin 10 through the mixer/conditioner 12 and into the pellet mill 25. The temperature of the material in the bin is sensed by the sensor 106 which sends a signal to the meter 108. When the material first reaches the pellet mill 25, its temperature is again sensed by the sensor 109 which also sends a signal to the meter 108. Since, as yet, no live stream is being added to the mixer/conditioner 12, the $\Delta T$ reading of the needle 115 will be lower than the lower limit pointer 113. This will cause a signal to be fed through the conductor 116 to the automatic control and antibacklash network 117 which will produce pulse signals on the output conductor 235 (FIG. 2) closing the triac A.C. switch 236 and exciting a winding of the motor 231 to cause the modulating steam valve 57 to open in small increments. This will alow the selected steam (either low or high pressure) to be fed to the chambers of the mixer/conditioner 12 and be mixed with the milled material. This will cause the temperature of the material to increase at the pellet mill, which increase will be sensed by the sensor 109 causing the needle 115 on the meter 108 to rise. When the needle 115 rises above the pointer 113, the pulse-type output signals on the conductor 235 from the network 117 will stop and the valve 57 will hold its position. Should the temperature of the material become too great at the pellet mill, such that the needle 115 rises above the upper limit pointer 114, a signal is fed through the conductor 118 causing a pulse-type signal to appear on the output conductor 225 of the network 117 which closes the triac A.C. switch 229 and causes the valve 57 to close incrementally with each pulse. Thus, the network 117 operates to automatically control the amount of live steam delivered to the chamber of the mixer/conditioner 12 such that $\Delta T$ remains within the prescribed limits set by the pointers 113 and 114.

Meanwhile, when the system was initially started, the load on the pellet mill motor 27 was quite low since there was no material being delivered to the pellet mill. Even after the first material reaches the pellet mill, the load is still quite low because the feed rate of the material in the start condition, as preset by the variable resistor 390, is quite low. This load condition is sensed by the transducer 132 which feeds a signal representing the load through the conductor 130 to the load meter 125. Since the load on the motor 27 is initially quite low, the needle 126 will in all probability read below the set pointer 127. This causes a signal to be fed through the conductor 138 to the preamp 254 (FIG. 3) producting a 1 level signal at the output of the AND gate 271 which is fed through the conductor 288 to enable one input of the AND gate 290. This condition also produces a 0 level signal at the output of the AND gate 280 and therefore a 1 level signal at the input of the oscillator 296 causing the oscillator to oscillate and producing at the output of the monostable multivibrator 301 a series of short pulses which are fed to the other input of the AND gate 290. With the AND gate 290 enabled, these pulses are fed to one input of the AND gate 307.

Before the AND gate 307 is enabled, its other input must receive a 1 level signal through the conductor 144 from the output of the automatic control and antibacklash network 117 (FIG. 2), and this occurs only when $\Delta T$ is satisfied, that is, only when the needle 115 is between the set pointers 113 and 114 of the meter 108. Therefore, unless $\Delta T$ is satisfied, the feed rate of the material will not be increased regardless of the load condition on the motor 27.

When $\Delta T$ is satisfied, a signal is fed from the output of the network 117 through the conductor 144 to enable the AND gate 307. The series of short pulses from the multivibrator 301 are then fed to the gate input of the triac switch 309, exciting the winding of the motor 147 which turns up the speed pot 148 so as to increase the speed rate of the motor 18 and the feed rate of the material to the pellet mill. When the needle 126 rises above the lower set point 127, the operating load condition is satisfied and the feed rate of the material is increased not further.

From initial start-up, and after $\Delta T$ is first satisfied, it will likely happen that as the feed rate of the material is then increased to satisfy the load requirements, $\Delta T$ will drop off to below the lower set pointer 113. When this occurs the AND gate 307 will be disabled, and the increase in feed rate to satisfy the load equipment will be temporarily discontinued until $\Delta T$ is again satisfied. The feed rate increase may have to be discontinued several times until both $\Delta T$ and the load requirements are satisfied. When this occurs, the system is in normal operation and the network 117 will continue to operate to maintain ΔT within the prescribed limits.

It may also happen that as corrections are made in ΔT to maintain the prescribed limits, the feed rate may increase somewhat. This might occur, for example, where a change in ΔT outside the prescribed limits would produce a temporary drop in load below the operating limits set by the pointer 127. If this occurs, and after ΔT is again satisfied, the feed rate will be increased to meet the load requirement and this may mean that ultimately the load will move further upscale toward the overload limit set by the pointer 128. However, as long as the needle 126 is below the pointer 128, the system operates normally.

When an overload conditions occurs, the automatic system of this invention controls the necessary functions of the system to relieve the overload. An overload might occur from any one of numerous causes. For example, a slug of material may hit the pellet mill 25 that is of improper composition causing the load to increase. An overload condition might ultimately also occur if there is a temporary reduction in the amount of material delivered to the feed screw from the bin 10. This temporary reduction in material would cause the load to drop below the limit set by the set pointer 127 which would cause the speed of the feed screw motor 18 to increase. But, when a normal amount of feed is again delivered to the feed screw, and with the feed screw now traveling at an increased rate, the pellet mill might then become overloaded to raise the needle 126 above the set pointer 128. Other conditions might also cause an overload, and although precautions are taken to prevent such abnormal conditions form occurring, they nevertheless do occur. The system of this invention relieves the overload condition and automatically places the system back in normal operation.

When an overload occurs, such that the needle 126 moves above the set pointer 128, a signal is fed through the conductor 142 to the preamp 250 producing a 1 level signal at the output of the AND gate 260. When the needle 126 had been below the pointer 127, the back pedal flip-flop 136 had a 0 level signal at its input 315 and a 1 level signal at its input 319. These signal conditions must reverse before the flip-flop 316 will reverse the signals at its output. This reversal only occurs when the needle 126 moves above the pointer 128 to bring the input 315 to a 1 level and the input 319 to a 0 level. This in turn produces a 1 level signal at the output 320 and a 0 level signal at the output 400 of the flip-flop 316. The 1 level signal at the output 320 is fed through the conductor 375 to the one input of the AND gate 376. Since the switch 264 is in the automatic position, the other input 377 of the AND gate 376 is enabled producing a 1 level signal at its output which is fed through the conductor 380 to the filament 381 of the photo coupler 382. This excites the photo coupler 382, turning on the transistor 387, and shorting out the speed pot 148 and variable resistor 390. With the inputs 393 and 394 to the SCR drive 150 shorted, the feed screw motor 18 stops. The 0 level signal at the output 400 of the flip-flop 316 is fed through the OR gate 401 and the conductor 406 to open the overload triac switch 408. With the switch 408 opened, the appropriate one of the relay coils 245 and 246, and additionally the relay coil 247 (assuming the switch 159 is closed and liquid ingredient is being added to the material) are deenergized causing the appropriate one of the flow control valve 52 or 69 to close, actuating the diverter valve 88 to divert the liquid ingredient away from the line 90 leading to the material and back to the supply tank 75, and turning off the flow control valve 96 supplying steam to the liquid ingredient.

Also as soon as the overload occurs, the 0 level signal at the output of the flip-flop 320 is fed through the conductor 321 to the strobe 322 thereby producing a strobe pulse at its output which is fed through the OR gate 325 to the monostable multivibrator 327. The monostable multivibrator 327, in response to the strobe pulse, generates at its output 330 a pulse of fixed width which is fed through the conductor 331 to the one input of the AND gate 332. With the switch 264 in the automatic position, the AND gate 332 is enabled, and the pulse is fed through the conductor 340 to cause the triac switch 341 to close. This in turn energizes a winding of the motor 147 so as to turn down the speed pot 148. This is important because although the feed screw motor 18 is now turned off, when the overload condition is relieved and the system starts up again, it is undesirable to start the feed motor immediately at the same speed as during overload. The fixed width pulse at the input of the triac switch 341 causes the motor 147 to turn the speed pot 148 back an amount proportional to the duration of the pulse, with the result that the feed screw motor 18 starts up at a lower speed, than the speed at overload, after the overload condition is relieved.

The pulse at the output 330 from the monostable multivibrator 327 is also fed through the conductor 172 to an input of the OR gate 226 (FIG. 2) and through the conductor 227 to close the triac switch 229. This energizes a winding of the motor 231 which causes the valve 57 to close an amount proportional to the duration of the back pedal pulse. This, too, is important since although the live stream supply is cut off by closing the appropriate valve 52 or 69 when the overload occurs, it is desirable to supply a lesser amount of live steam to the material, then the amount supplied during previous operation of the system, after the overload is relieved.

Thus, when an overload condition occurs, not only is the supply of live steam turned off, the supply of steam and liquid ingredient turned off, and the feed screw motor 18 stopped, but also adjustments are made to insure that the speed of the motor 18 and the amount of live steam supplied after the overload condition is relieved are less than during normal operation. This allows the system to achieve normal operation without immediately going back into another overload condition.

The valve 96 and 52 or 69 will remain off, the valve 88 will remain actuated to divert the liquid ingredient, and the feed screw motor will remain stopped until the needle 126 moves from its overload position above the pointer 128 to below the pointer 127. Only when the needle 126 moves downscale across both pointers 128 and 127 will the signals at the input of the back pedal flip-flop 316 reverse causing a reversal of the signals at its output. When this occurs, the photo coupler 382 is turned off as is the transistor 387 to remove the short across the inputs 393 and 394 to the SCR drive. This then allows the feed screw motor 18 to run at a speed determined by the position of the speed pot 148, which as will be recalled, has since been turned back by the back pedal pulse. Also the reversal of the outputs of the flip-flop 316 allows the triac switch 408 to close thereby energizing the relay coil 245 or 246 and the relay coil 247 to open the appropriate one of the live steam valves 52 or 69, open the valve 96, and actuate the diverter valve 88 to deliver liquid ingredient to the material.

In the meantime since the supply of live steam has been turned off during overload, Δ T may have dropped to below the lower limit pointer 113. Whether this has occurred or not, the system will now operate, as heretofore described from a start-up condition, to again achieve normal operation.

If it should happen, as it occasionally does, that immediately after the overload is relieved, and the needle 126 drops below the limit 127, another overload occurs, the same functions will again be shut off and again a back pedal pulse will be generated to drive the speed pot 148 even further back and the valve 57 even further closed so that when the overload is relieved and the needle 126 drops below the limit pointer 127, the feed screw motor 18 starts operating at even a lower speed, and even a lesser amount of live steam is applied to the mixer/conditioner 12. If the system continues to immediately go back into overload once each overload condition is relieved, eventually the speed pot 148 will be turned all the way back and the steam valve 57 completely closed such that the conditions are the same as when the system is initially started. From there the system will attain normal operation as heretofore described.

In addition to an overload condition, the opening of any one of the interlock stitches 359 will have the same effect on the system so as to turn off the functions previously described and generate the back pedal pulse as previously described. Thus, if one of the switches 359 opens, the appropriate one of the coils 245 or 246, and the coil 247 is deenergized to close the appropriate valve 52 or 69, and close the valve 69 and actuate the diverter 88 to divert the liquid ingredient away from the mixer/conditioner 12. Also, when one of the interlock switches 359 opens, the photo coupler 353 is excited, raising the input conductor 350 to the OR gate 325 to a 1 level and thereby producing a back pedal pulse at the output of the monostable multivibrator 327 which is applied in the manner heretofore described. When the interlock function is corrected and the switch 359 closes, the valve 52 or 69, and the valve 96 open. Also, the diverter valve 88 is actuated to again feed liquid ingredient to the material.

If an overload condition persists for a prescribed duration, the system of this invention automatically controls further functions of the system. When an overload condition exists, the 1 level signal at the output of the AND gate 260 produces a 0 level signal at the output of the AND gate 280 and a 1 level signal at the input of the oscillator 296. This causes the oscillator 296 to oscillate and produce a series of short pulses at the output of the monostable multivibrator 301. These pulses are fed through the conductors 303 and 415 to one input of the AND gate 416. The output of the counter 420 is at a 0 level until it reaches the prescribed count so that the AND gate 416 is enabled causing the counter 418 to count the pulses from the multivibrator 301. When the prescribed count is reached, the output 420 of the counter 418 goes to a 1 level disabling the AND gate 416, and closing the triac switch 422. This energizes the relay coil 248 which in turn opens the chute portion 30 to dump the material and turns off the mixer/conditioner paddle motors 20 and 21. As soon as the needle 126 drops below the overload pointer 128, the output of the AND gate 280 goes to a 1 level which signal is fed through the OR gate 433 to reset the counter 418, dropping its output to a 0 level, and deenergizing the coil 248. This will close the chute portion 30 and turn on the motors 20 and 21. The counter 418 will remain resest even when the needle 126 drops below the pointer 127 because of the 1 level signal produced at the output of the AND gate 271 which is also fed through the OR gate 433 to hold the counter in the reset state.

It should be mentioned that while the pulses from the monostable multivibrator 301 are also fed through the conductor 304 to the AND gate 290 when the system is in an overload condition, the other input to the gate 290 is disabled since the output of the AND gate 271 is at a 0 level. For this reason these pulses cannot produce an increase in feed rate when the system is in overload.

Meanwhile, the ratio network 187, meter 191, and automatic control and antibacklash network 197 operate as heretofore described to maintain a constant percent liquid ingredient in the material, assuming the liquid ingredient system is on.

Thus, there has been described an automatic pellet producing system which greatly increases the efficiency of pellet production and the quality of pellets produced, and which otherwise fulfills the objectives and overcomes the problems heretofore described.

Various changes and modifications may be made in this invention, as will be readily apparent to those skilled in the art. Such changes and modifications are within the scope and teaching of this invention as defined by the claims appended hereto.

What is claimed is:

1. An automatic control system for a pelleting apparatus, the apparatus including a pellet producing means and means for feeding a supply of milled material to the producing means, said control system comprising means for automatically controlling the moisture content of the material at the producing means to within a prescribed range, and means responsive to said moisture content controlling means for automatically controlling the feed rate of the material to the producing means.

2. The control system of claim 1 wherin the control means further comprises means responsive to said moisture content controlling means for automatically inhibiting any increase in feed rate of the material unless the moisture content is within the prescribed range.

3. The control system of claim 1 further comprising means for establishing an operating load range for the producing means, and means responsive to said moisture content controlling means for automatically controlling the feed rate of the material so as to produce a load on the producing means within the established operating load range.

4. The control system of claim 3 further comprising means responsive to said moisture content controlling means for automatically inhibiting any increase in feed rate of the material unless the moisture content is within the prescribed range, irrespective of the load on the producing means.

5. The control system of claim 3 further comprising means for sensing when the load on the producing means is above the prescribed load range, means for automatically reducing the feed rate of the material in response to sensing the overload condition, and means for maintaining the reduction of feed rate until the load on the producing means drops below the prescribed load range.

6. The control system of claim 5 further comprising means responsive to said overload sensing means for automatically establishing a reduced feed rate for the material, below the normal operating rates as when the load is within the prescribed load range.

7. The control system of claim 6 further comprising means for detecting when the load on the producing means rises above the prescribed load range for a prescribed duration, and means responsive to said detecting means for automatically discontinuing the delivery of the material from the input of the producing means when the prescribed overload duration is detected.

8. The control system of claim 6 wherein the pelleting apparatus further comprises a mixer/conditioner at the input of the producing means, which mixer/conditioner has mixing means therein and means for actuating the mixing means, and wherein the material is fed through the mixer/conditioner to the producing means, the control system further comprising means responsive to said overload sensing means for automatically deactivating the actuating means when the prescribed overload duration is sensed.

9. The control system of claim 3 wherein the pelleting apparatus further includes means for adding a liquid ingredient to the material prior to entering the producing means, the system further comprising means for sensing when the load on the producing means is above the prescribed load range, the means responsive to said overload sensing means for reducing the supply of liquid ingredient to the material whenever the load is above said prescribed load range.

10. The control system of claim 9 further comprising control means for automatically controlling the supply of liquid ingredient to the material in response to the feed rate of the material to maintain the percent liquid of the material within a prescribed range.

11. An automatic control system for a pelleting apparatus, the apparatus including a pellet producing means and means for feeding a supply of milled material to the producing means, said control system comprising means for automatically controlling the moisture content of the material at the producing means to within a prescribed range, means for sensing the load on the producing means, means for establishing an operating load range for the producing means, means for automatically controlling the feed rate of the material so as to produce a load on the producing means within the established operating load range, means for increasing the feed rate of the material in response to the sensed load being below the operating load range only when the moisture content of the material is within the prescribed moisture range, means for automatically reducing the feed rate of the material to a first rate in response to sensing a load condition above the prescribed load range, means for automatically establishing a second feed rate for the material for when the load drops from above to below the prescribed load range in response to sensing a load condition above the prescribed load range, means for maintaining said first feed rate until the load drops below the prescribed range, and means for establishing said second feed rate when the load drops from above to below the prescribed range.

12. The control system of claim 11 wherein the means for automatically controlling the moisture content of the material at the producing means further comprises means for applying steam at a controlled rate to the material prior to entering the pellet producing means to maintain the moisture content within the prescribed moisture range, the control system further comprising means responsive to the detection of a load above the prescribed load range for automatically reducing the rate at which steam is applied to a first rate irrespective of the moisture content of the material, means for automatically establishing a second rate at which steam is applied for when the load drips from above to below the prescribed load range in response to sensing a load condition above the prescribed load range, means for maintaining said first rate of steam until the load drops below the prescribed range, and means for establishing said second rate of steam when the load drops from above to below the prescribed load range.

13. An automatic control system for a pelleting apparatus, the apparatus including a pellet producing means and means for feeding a supply of milled material to the producing means, said control system comprising means for sensing the temperature of the material at a first location of the material prior to entering the producing means, means for sensing the temperature of the material at a second location as it enters the producing means, means for sensing the difference between said temperatres in response to the temperature sensing means, means for establishing a range within which the difference between said temperatures is to be controlled, means for automatically controlling the heat content of the material between said first and second locations to maintain said temperature differential within the prescribed range, and means for automatically controlling the feed rate of the material to the producing means in response to said temperature differential control means.

14. The control system of claim 13 further comprising means responsive to said temperature differential control means for automatically inhibiting any increase in the feed rate of the material unless the temperature differential is within the prescribed range.

15. The control system of claim 13 further comprising means for sensing the load on the producing means, means for establishing an operating load range for the producing means, and means responsive to said load sensing means for automatically adjusting the feed rate of the material so as to produce a load on the producing means within the prescribed load range.

16. The control system of claim 15 further comprising means responsive to the temperature differential control means for automatically inhibiting any increase in the feed rate of the material unless the temperature differential is within the prescribed range, irrespective of the load on the producing means.

17. The control system of claim 15 further comprising means for sensing when the load on the producing means is above the prescribed load range, means responsive to said overload sensing means for automatically reducing the feed rate of the material in response to sensing the overload condition, and means for maintaining the reduction of feed rate until the load on the producing means drops below the prescribed range.

18. The control system of claim 17 further comprising means responsive to said overload sensing means for automatically establishing a reduced feed rate for the material, below the normal operating rates as when the load is within the prescribed load range, for when the load drops from above to below the prescribed load range.

19. The control system of claim 13 wheren the means for adjusting the temperature of the material between the first and second locations further comprises a source of steam, and means for applying a controlled amount of said steam to said material between said first and second locations to maintain said temperature differential within the prescribed range.

20. The control system of claim 19 further comprising means for sensing the load on the producing means, means for establishing an operating load range for said producing means, means for detecting when the load is outside the load range, means for automatically controlling the feed rate of the material to the producing means in response to the detecting means to maintain the load within the prescribed load range, means for automatically inhibiting an increase in feed rate of the material to the producing means unless the temperature differential is within the prescribed range irrespective of the load on the producing means, and means responsive to the detection of a load above the prescribed range for reducing the feed rate and steam supply irrespective of the temperature differential.

21. The control system of claim 20 further comprising means responsive to the detection of a load above the prescribed range for automatically establishing a lower feed rate for the material and a reduced amount of steam, compared to the feed rate and amount of steam supplied when the temperature differential and load are within the prescribed ranges, for when the load drops from above the below the prescribed load range.

22. An automatic control system for a pelleting apparatus, the apparatus including a pellet producing means and means for feeding a supply of milled material to the producing means, the automatic control system comprising means for automatically controlling the moisture content of the material at the producing means to within a prescribed range, means for sensing the load on the producing means, means for establishing an operating load range for the producing means, means for automatically controlling the feed rate of the material so as to produce a load on the producing means within the established operating range, means for detecting when the load on the producing means rises above the prescribed load range for a prescribed duration, and means for automatically discontinuing the feeding of the material to the input of the producing means when the prescribed overload duration is detected.

23. An automatic control system for a pelleting apparatus, the apparatus including a pellet producing means, a mixer/conditioner at the input of the producing means, which mixer, conditioner has mixing means therein, means for actuating the mixing means, and means for feeding a supply of milled material through the mixer/conditioner to the producing means, the automatic control system comprising means for automatically controlling the moisture content of the material at the producing means to within a prescribed range, means for sensing the load on the producing means, means for establishing an operating load range for the producing means, means for automatically controlling the feed rate of the material so as to produce a load on the producing means within the established operating range, means for detecting when the load on the producing means rises above the prescribed load range for a prescribed duration, and means for automatically deactivating the actuating means when the prescribed overload duration is detected.

24. A control system for a pelleting apparatus, the apparatus including a pellet producing means, and means for feeding a supply of milled material to the producing means, said control system comprising a first network for automatically controlling the moisture content of the material at the producing means to within a prescribed range and for generating an enable signal when the moisture content is within the prescribed range, and a second network including means for detecting the load on the producing means, means for establishing an operating load range for the producing means, and means for automatically controlling the feed rate of the material when the enable signal is received from said first network so as to produce a load on the producing means within the established operating load range.

25. The control system of claim 24 further comprising means associated with said networks for generating a first signal when the load exceeds the established load range, means in response to said first signal for reducing the feed rate of the material, means for generating said first signal until the load drops below the established load range, means for generating a second signal when the load exceeds the established load range, and means in response to the generation of said second signal for establishing a feed rate for the material for when the load drops from above to below the established load range.

26. The control system of claim 25 wherein the second signal is a pulse of selected width, and wherein the feed rate of the material when the load drops from above to below the established range is reduced an amount proportional to the width of said pulse.

27. The control system of claim 26 wherein the feed rate of the material in response to said first signal is reduced to zero.

28. The control system of claim 26 wherein said first network further includes means for applying a controlled amount of steam to the material prior to entering the pellet producing means to maintain the moisture content within the prescribed moisture range, the control system further comprising means in response to said first signal for reducing the supply of steam to a given amount, and means in response to the generation of said second signal for establishing an amount of steam to be supplied to the material when the load drops from above to below the established load range.

29. The control system of claim 28 wherein the amount of steam supplied when the load drops from above to below the established load range is reduced an amount proportional to the width of said pulse.

30. The control system of claim 29 wherein the supply of steam is reduced to zero in response to said first signal.

31. The control system of claim 24 further comprising means for generating a series of pulses when the detected load rises above the established load range, means for counting said pulses, means for generating a signal when the count reaches a prescribed number, and means for discontinuing the feeding of the material to the input of the producing means in response to said signal.

32. The control system of claim 24 wherein the pelleting apparatus further includes a mixer/conditioner at the input of the producing means, which mixer/conditioner has mixing means therein, and means for actuating the mixing means, and wherein the material is fed through the mixer/conditioner to the producing means, the control system further comprising means for generating a series of pulses when the detected load rises above the established load range, means for counting said pulses, means for generating a signal when the count reaches a prescribed number, and means for deactivating the actuating means in response to said signal.

33. A control system for a pelleting apparatus, the apparatus including a pellet producing means, and means for feeding a supply of milled material to the producing means, said control system comprising means for generating a first signal representative of the temperature of the material at a first location of the material prior to entering the producing means, means for generating a second signal representative of the temperature of the material at a second location as it enters the producing means, means in response to said first and second signals for detecting the difference between the temperatures of the material at the two locations, a first network including means for establishing a range within which the difference between said temperatures is to be controlled, means for automatically controlling the heat content of the material between said first and second locations to maintain said temperature differential within the prescribed range, and means for generating an enable signal when the temperature difference is within the prescribed range, and a second network including means for detecting the load on the producing means, means for establishing an operating load range for the producing means, and means for automatically controlling the feed rate of the material when the enable signal is received from said first network so as to produce a load on the producing means within the established operating load range.

34. The control system of claim 33 further comprising means associated with said networks for generating a first signal when the load exceeds the established load range, means in response to said first signal for reducing the feed rate of the material, means for generating said first signal until the load drops below the established load range, means for generating a second signal when the load exceeds the established load range, and means in response to the generation of said second signal for establishing a feed rate for the material for when the load drops from above to below the established load range.

35. The control system of claim 34 wherein the second signal is a pulse of selected width, and wherein the feed rate of the material when the load drops from above to below the established range is reduced in amount proportional to the width of said pulse.

36. The control system of claim 35 wherein the feed rate of the material in response to said first signal is reduced to zero.

37. The control system of claim 35 wherein said first network further includes means for applying a controlled amount of steam to the material between said first and second locations to maintain the temperature differential within the prescribed range, the control system further comprising means in response to said first signal for reducing the supply of steam to a given amount, and means in response to the generation of said second signal for establishing an amount of steam to be supplied to the material when the load drops from above to below the established load range.

38. The control system of claim 37 wherein the amount of steam supplied when the load drops from above to below the established load range is reduced an amount proportional to the width of said pulse.

39. The control system of claim 38 wherein the supply of steam is reduced to zero in response to said first signal.

40. An automatic control system for a pelleting apparatus, the apparatus including a pellet producing means and means for feeding a supply of milled material to the producing means, said control system comprising means for sensing the temperature of the material at a first location of the material prior to entering the producing means, means for sensing the temperature of the material at a second location as it enters the producing means, means for sensing the difference between said temperatures in response to the temperature sensing means, means for establishing a range within which the difference between said temperatures is to be controlled, and means for automatically controlling the heat content of the material between said first and second location to maintain said temperature differential within the prescribed range.

41. A system for automatically producing feed pellets comprising a pellet producing means, means for feeding a supply of milled material to the producing means, and a control system, the control system further comprising means for automatically controlling the moisture content on the material at the producing means to within a prescribed range, and means responsive to said moisture content controlling means for automatically controlling the feed rate of the material to the producing means.

42. The system of claim 41 further comprising means for establishing an operating load range for the producing means, and means responsive to said moisture content controlling means for automatically controlling the feed rate of the material so as to produce a load on the producing means within the established operating load range.

43. The system of claim 42 further comprising means responsive to said moisture content controlling means for automatically inhibiting any increase in feed rate of the material unless the moisture content is within the prescribed range, irrespective of the load on the producing means.

44. A system for automatically producing feed pellets comprising a pellet producing means, means for feeding a supply of milled material to the producing means, a control system, the control system further comprising means for automatically controlling the moisture content of the material at the producing means to within a prescribed range, means for sensing the load on the producing means, means for establishing an operating load range for the producing means, means for automatically controlling the feed rate of the material so as to produce a load on the producing means within the established operating load range, means for increasing the feed rate of the material in response to the sensed load being below the operating load range only when the moisture content of the material is within the prescribed moisture range, means for automatically reducing the feed rate of the material to a first rate in response to sensing a load condition above the prescribed load range, means for automatically establishing a second feed rate for the material for when the load drops from above to below the prescribed load range in response to sensing a load condition above the prescribed load range, means for maintaining said first feed rate until the load drops below the prescribed range, and means for establishing said second feed rate when the load drops from above to below the prescribed range.

45. The system of claim 44 further comprising means for applying steam at a controlled rate to the material prior to entering the pellet producing means to maintain the moisture content within the prescribed moisture range, the control system further comprising means responsive to the detection of a load above the prescribed load range for automatically reducing the rate at which the steam is applied to a first rate irrespective of the moisture content of the material, means for automatically establishing a second rate at which steam is applied for when the load drops from above to below the prescribed load range in response to sensing a load condition above the prescribed load range, means for maintaining said first rate of steam until the load drops below the prescribed range, and means for establishing said second rate of steam when the load drops from above to below the prescribed load range.

46. The system of claim 44 further comprising a mixer/conditioner at the input of the producing means which mixer/conditioner has mixing means therein and means for actuating the mixing means, and wherein the material is fed through the mixer/conditioner to the producing means, the control system further comprising means for automatically deactivating the actuating means when the prescribed overload duration is sensed.

47. A system for automatically producing feed pellets comprising a pellet producing means, means for feeding a supply of milled material to the producing means, a control system, the control system further comprising means for sensing the temperature of the material at a first location of the material prior to entering the producing means, means for sensing the temperature of the material at a second location as it enters the producing means, means for sensing the temperature difference between said temperatures in response to the temperature sensing means, means for establishing a range within which the difference between said temperatures is to be controlled, means for automatically controlling the heat content of the material between said first and second locations to maintain said temperature differential within the prescribed range, and means for automatically contolling the feed rate of the material to the producing means in response to said temperature differential control means.

48. The system of claim 47 wherein the means for adjusting the temperature of the material between the first and second locations further comprises a source of steam, and means for applying a controlled amount of said steam to said material between said frst and second locations to maintain said temperature differential within the prescribed range.

49. The system of claim 48 further comprising means for sensing the load on the producing means, means for establishing an operating load range for said producing means, means for detecting when the load is outside the load range, means for automatically controlling the feed rate of the material to the producing means in response to the detecting means to maintain the load within the prescribed load range, means for automatically inhibiting any increase in feed rate of the material to the producing means unless the temperature differential is within the prescribed range irrespective of the load on the producing means, and means responsive to the detection of a load above the prescribed range for reducing the feed rate and steam supply irrespective of the temperature differential.

50. A system for automatically producing feed pellets comprising a pellet producing means, means for feeding a supply of milled material to the producing means, a control system, the control system further comprising a first network for automatically controlling the moisture content of the material at the producing means to within a prescribed range and for generating an enable signal when the moisture content is within a prescribed range, and a second network including means for detecting the load on the producing means, means for establishing an operating load range for the producing means, and means for automatically controlling the feed rate of the material when the enable signal is received from said first network so as to produce a load on the producing means within the established operating load range.

51. The system of claim 50 further comprising a mixer/conditioner at the input of the producing means, which mixer/conditioner has mixing means therein, and means for actuating the mixing means, and wherein the material is fed through the mixer/conditioner to the producing means, the control system further comprising means for generating a series of pulses when the detected load rises above the established load range, means for counting said pulses, means for generating a signal when the count reaches a prescribed number, and means for deactivating the actuating means in response to said signal.

52. A system for automatically producing feed pellets comprising pellet producing means, means for feeding a supply of milled material to the producing means, a control system, which control system further comprises means for generating a first signal representative of the temperature of the material at a first location of the material prior to entering the producing means, means for generating a second signal representative of the temperature of the material at a second location as it enters the producing means, means in response to said first and second signals for detecting the difference between the temperatures of the material at the two locations, a first network including means for establishing the range within which the difference between said temperatures is to be controlled, means for automatically controlling the heat content of the material between said first and second locations to maintain said temperature differential within the prescribed range, and means for generating an enable signal when the temperature difference is within the prescribed range, and a second network including means for detecting the load on the producing means, means for establishing an operating load range for the producing means, and means for automatically controlling the feed rate of the material when the enable signal is received from said first network so as to produce a load on the producing means within the established operating load range.

53. The system of claim 52 wherein the control system further comprises means for generating a first signal when the load exceeds the established load range, means in response to said first signal for reducing the feed rate of the material, means for generating said first signal until the load drops below the established load range, means for generating a second signal when the load exceeds the established load range, and means in response to the generation of said signal for establishing a feed rate for the material for when the load drops from above to below the established load range.

54. The system of claim 53 wherein the second signal is a pulse of selected width, and wherein the feed rate of the material when the load drops from above to below the established load range is reduced an amount proportional to the width of said pulse.

55. The system of claim 54 comprising means for applying a controlled amount of steam to the material between said first and second locations to maintain the temperature differential within the prescribed range, the control system further comprising means in response to said first signal for reducing the supply of steam to a given amount, and means in response to the generation of said second signal for establishing an amount of steam to be applied to the material when the load drops from above to below the established load range.

* * * * *

UNITED STATES PATENT OFFICE
CERTIFICATE OF CORRECTION

Patent No. 3,932,736   Dated January 13, 1976

Inventor(s) Albert I. Zarow et al.

It is certified that error appears in the above-identified patent and that said Letters Patent are hereby corrected as shown below:

[73] Assignee "Beta Corporation of St. Louis, Bridgeton, Mo." should read -- said Volk, Jr., assor. to Beta Corporation, Bridgeton, Mo. --.

Signed and Sealed this ninth Day of August 1977

[SEAL]

Attest:

RUTH C. MASON
Attesting Officer

C. MARSHALL DANN
Commissioner of Patents and Trademarks